US011353959B2

(12) United States Patent
Kuji (10) Patent No.: US 11,353,959 B2
(45) Date of Patent: Jun. 7, 2022

(54) CONTROLLER DEVICE

(71) Applicant: Sony Interactive Entertainment Inc., Tokyo (JP)

(72) Inventor: Takuya Kuji, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/267,929

(22) PCT Filed: Aug. 21, 2018

(86) PCT No.: PCT/JP2018/030858
§ 371 (c)(1),
(2) Date: Feb. 11, 2021

(87) PCT Pub. No.: WO2020/039507
PCT Pub. Date: Feb. 27, 2020

(65) Prior Publication Data
US 2021/0181842 A1    Jun. 17, 2021

(51) Int. Cl.
*G06F 3/01* (2006.01)
*G06F 3/02* (2006.01)
*A63F 13/212* (2014.01)

(52) U.S. Cl.
CPC ............ *G06F 3/014* (2013.01); *A63F 13/212* (2014.09); *G06F 3/017* (2013.01); *G06F 3/02* (2013.01)

(58) Field of Classification Search
CPC ...... G06F 3/014; G06F 3/033; H03K 17/9622
USPC .......................................................... 345/156
See application file for complete search history.

(56) References Cited

U.S. PATENT DOCUMENTS

| | | | |
|---|---|---|---|
| 5,482,056 A * | 1/1996 | Kramer | A61B 5/1071 600/595 |
| 5,764,164 A * | 6/1998 | Cartabiano | A63F 13/06 341/22 |
| 10,444,849 B2 * | 10/2019 | Li | G06F 3/017 |
| 10,534,432 B2 | 1/2020 | Okumura | |
| 2002/0067334 A1 * | 6/2002 | Hinckley | G06F 3/0202 345/156 |
| 2002/0163495 A1 * | 11/2002 | Doynov | G06F 3/033 345/156 |
| 2004/0012557 A1 * | 1/2004 | Daniel | G06F 3/014 345/156 |

(Continued)

FOREIGN PATENT DOCUMENTS

| | | | |
|---|---|---|---|
| JP | 2017075465 A | 4/2017 | |
| JP | 2017535002 A | 11/2017 | |

(Continued)

OTHER PUBLICATIONS

International Search Report for corresponding PCT Application No. PCT/JP2018/030858, 8 pages, dated Oct. 9, 2018.

(Continued)

*Primary Examiner* — Albert K Wong
(74) *Attorney, Agent, or Firm* — Matthew B. Dernier, Esq.

(57) ABSTRACT

A controller device configured to be worn on a hand of a user includes a plurality of sensors that, in a state in which the user wears the controller device on the hand, are disposed along a virtual curved surface being projected toward a position of a thumb of the user and detect the position of the thumb of the user.

6 Claims, 6 Drawing Sheets

(56) References Cited

U.S. PATENT DOCUMENTS

| | | | | |
|---|---|---|---|---|
| 2004/0046732 A1* | 3/2004 | Chesters | ............... | G06F 3/0312 |
| | | | | 345/156 |
| 2005/0219355 A1* | 10/2005 | Tahara | .................... | G06F 3/033 |
| | | | | 348/14.05 |
| 2006/0164383 A1* | 7/2006 | Machin | ................. | G06F 3/0338 |
| | | | | 345/156 |
| 2006/0164386 A1* | 7/2006 | Smith | .................... | H04N 5/76 |
| | | | | 345/156 |
| 2007/0080934 A1* | 4/2007 | Chen | .................... | G06F 3/0383 |
| | | | | 345/156 |
| 2007/0249422 A1* | 10/2007 | Podoloff | ............... | G06F 3/0219 |
| | | | | 463/43 |
| 2009/0115729 A1* | 5/2009 | Groener | .................. | G06F 3/033 |
| | | | | 345/167 |
| 2011/0050566 A1* | 3/2011 | Sawai | .................... | G06F 3/048 |
| | | | | 345/157 |
| 2014/0267024 A1* | 9/2014 | Keller | .................... | G06F 3/0233 |
| | | | | 345/156 |
| 2016/0062489 A1 | 3/2016 | Li | | |
| 2016/0361638 A1 | 12/2016 | Higgins | | |
| 2019/0018555 A1* | 1/2019 | Jing | ..................... | G06F 3/0486 |
| 2019/0025916 A1 | 1/2019 | Okumura | | |
| 2019/0278372 A1* | 9/2019 | Nakagawa | ............. | A63F 13/22 |

FOREIGN PATENT DOCUMENTS

| | | |
|---|---|---|
| WO | 2008111138 A1 | 9/2008 |
| WO | 2017150129 A1 | 9/2017 |

OTHER PUBLICATIONS

International Preliminary Report on Patentability and Written Opinion for corresponding PCT Application No. PCT/JP2018/030858, 19 pages, dated Mar. 4, 2021.

* cited by examiner

CONTROLLER DEVICE

TECHNICAL FIELD

The present invention relates to a controller device used while being worn on a hand of a user, an information processing device, an information processing method, and a program.

BACKGROUND ART

In technology such as virtual reality, for example, an operation input from a user is sometimes received through a gesture such as a movement of a finger of the user. As one of techniques for recognizing such a movement of a finger of the user, a method has been considered which allows a controller device to be worn on a hand of the user and allows a sensor disposed on a surface of the controller device to detect a state of the finger of the user.

SUMMARY

Technical Problem

Among fingers of a human hand, a thumb has a wider movable range than other four fingers, and thus, detecting an accurate position of the thumb requires a sensor having a wide detection-target range. In particular, attempting to accurately detect the position of the thumb, by using a sensor having a relatively small detection range, a large number of the sensors are required.

The present invention has been made in view of the above situation, and an object of the present invention is to provide a controller device, an information processing device, an information processing method, and a program that are capable of efficiently identifying a state of the thumb of a hand of a user using a limited number of sensors.

Solution to Problem

A controller device according to an aspect of the present invention is a controller device configured to be worn on a hand of a user, and includes a plurality of sensors that, in a state in which the user wears the controller device on the hand, are disposed along a virtual curved surface being projected toward a position of a thumb of the user and detect the position of the thumb of the user.

An information processing device according to an aspect of the present invention includes an acquisition section that acquires, from a controller device configured to be worn on a hand of a user and including a plurality of sensors that, in a state in which the user wears the controller device on the hand, are disposed along a virtual curved surface being projected toward a thumb of the user and detect a position of the thumb of the user, detection values of the plurality of individual sensors, and a state identification section that identifies a state of the thumb of the user by calculating a rotation angle of at least one or more joints of the thumb of the user on the basis of the acquired detection values.

An information processing device according to an aspect of the present invention is an information processing device for controlling a controller device configured to be worn on a hand of a user and including a sensor that detects a position of a finger of the user within a predetermined detection range and an operation button operated by the finger, and includes an acquisition section that acquires a detection result of the sensor, and a state identification section that identifies a state of the finger on the basis of the detection result of the sensor. When the operation button is pushed, the state identification section rejects the detection result of the sensor and identifies the state of the finger on the basis of an operation amount detected by the operation button.

An information processing method according to an aspect of the present invention includes the steps of acquiring, from a controller device configured to be worn on a hand of a user and including a plurality of sensors that, in a state in which the user wears the controller device on the hand, are disposed along a virtual curved surface being projected toward a thumb of the user and detect a position of the thumb of the user, detection values of the plurality of individual sensors, and identifying a state of the thumb of the user by calculating a rotation angle of at least one or more joints of the thumb on the basis of the acquired detection values.

A program according to an aspect of the present invention is a program for causing a computer to execute the steps of acquiring, from a controller device configured to be worn on a hand of a user and including a plurality of sensors that, in a state in which the user wears the controller device on the hand, are disposed along a virtual curved surface being projected toward a thumb of the user and detect a position of the thumb of the user, detection values of the plurality of individual sensors, and identifying a state of the thumb of the user by calculating a rotation angle of at least one or more joints of the thumb on the basis of the acquired detection values. The program may be provided in such a way as to be stored in a non-transitory computer-readable information storage medium.

DESCRIPTION OF EMBODIMENT

Hereinafter, an embodiment of the present invention will be described in detail on the basis of the drawings.

Figure 1:
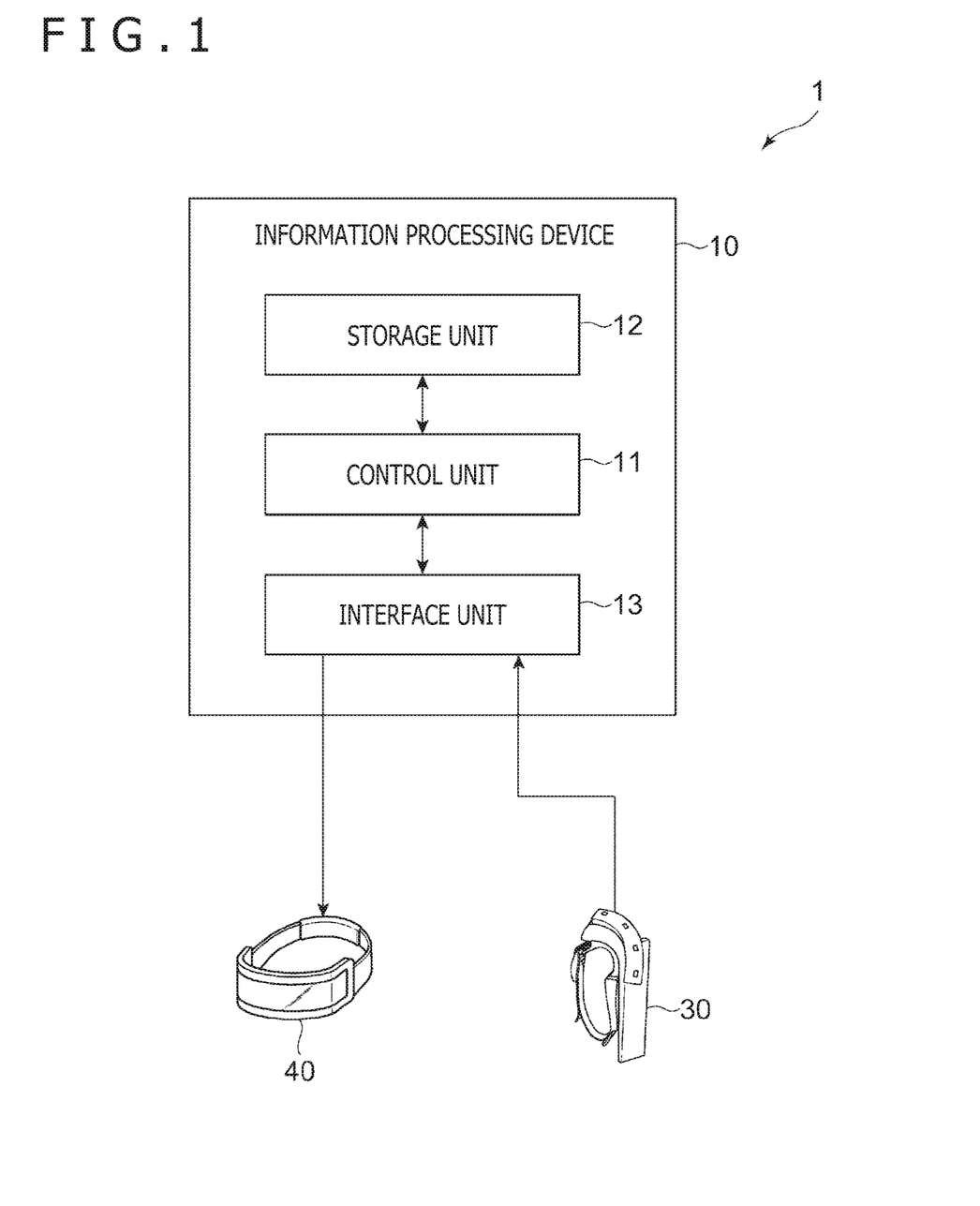
FIG. 1 is a configuration block diagram of an information processing system including a control device according to an embodiment of the present invention.

FIG. 1 is a configuration block diagram illustrating an overview of an information processing system 1 including a controller device according to an embodiment of the present invention. As illustrated in FIG. 1, the information processing system 1 includes an information processing device 10, a controller device 30, and a head-mounted type display device 40. In the present embodiment, the information processing device 10 functions as a control device for controlling the controller device 30.

The information processing device 10 is a device for processing results of detections by the controller device 30 and may be, for example, a home game machine, a handheld game machine, a personal computer, a smartphone, a tablet, or the like. As illustrated in FIG. 1, the information processing device 10 includes a control unit 11, a storage unit 12, and an interface unit 13.

The control unit 11 includes at least one processor such as a CPU (Central Processing Unit) and performs various information processes by executing programs stored in the storage unit 12. Note that a specific example process performed by the control unit 11 in the present embodiment will be described later. The storage unit 12 includes at least one memory device such as a RAM (Random Access Memory) and stores the program executed by the control unit 11 and data processed by the program.

The interface unit 13 is an interface for data communication with the controller device 30 and the display device 40. The information processing device 10 is coupled to each of the controller device 30 and the display device 40 in a wired or wireless manner via the interface unit 13. Specifically, the interface unit 13 includes a multimedia interface such as HDMI (registered trademark) (High-Definition Multimedia Interface) to transmit video data supplied by the information processing device 10 to the display device 40. Further, the interface unit 13 includes a data communication interface such as a USB (Universal Serial Bus) to receive the results of the detections by the controller device 30.

Figure 2:
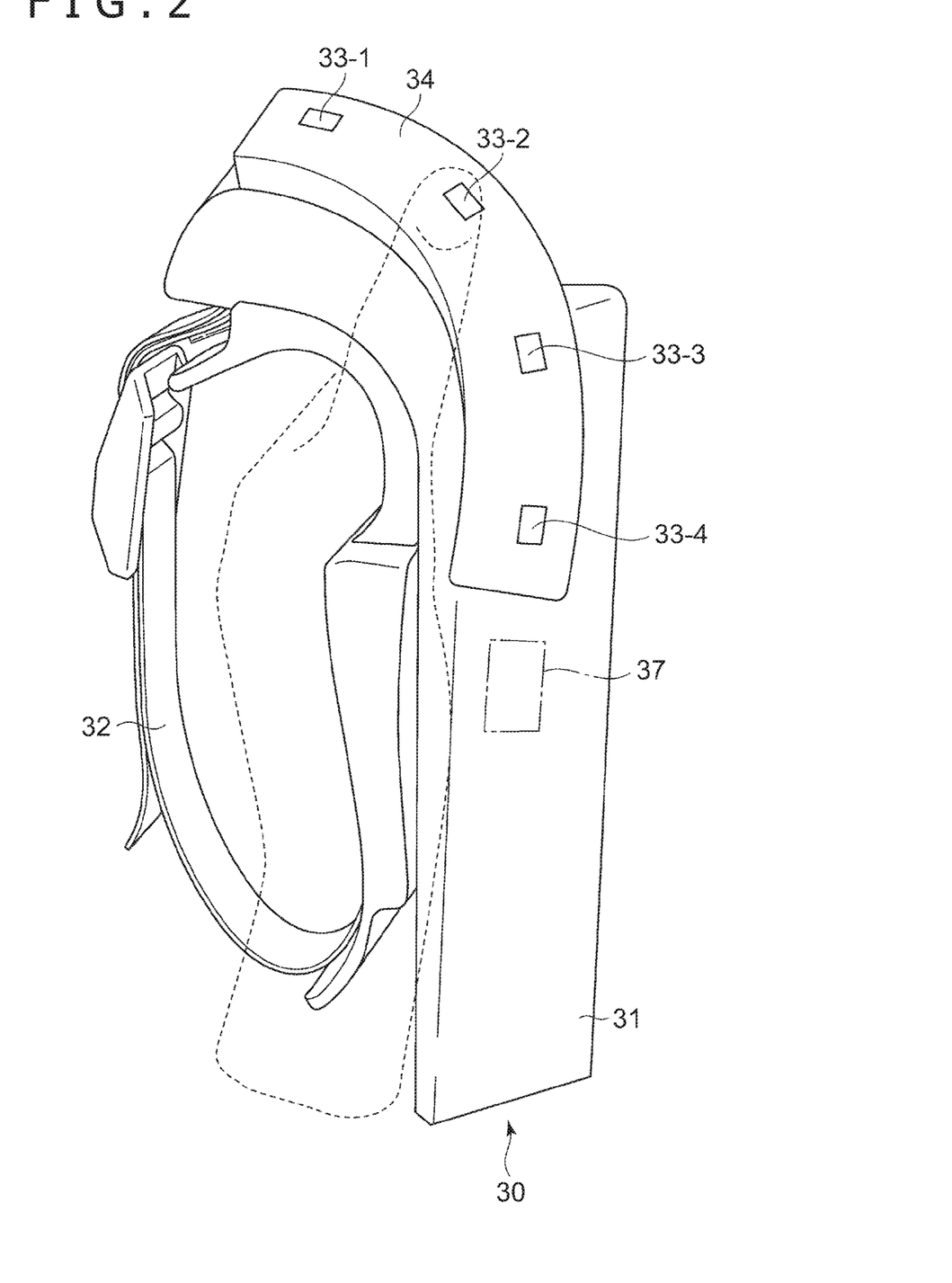
FIG. 2 is a perspective view of a controller device illustrating an example of an external appearance thereof.
Figure 3:
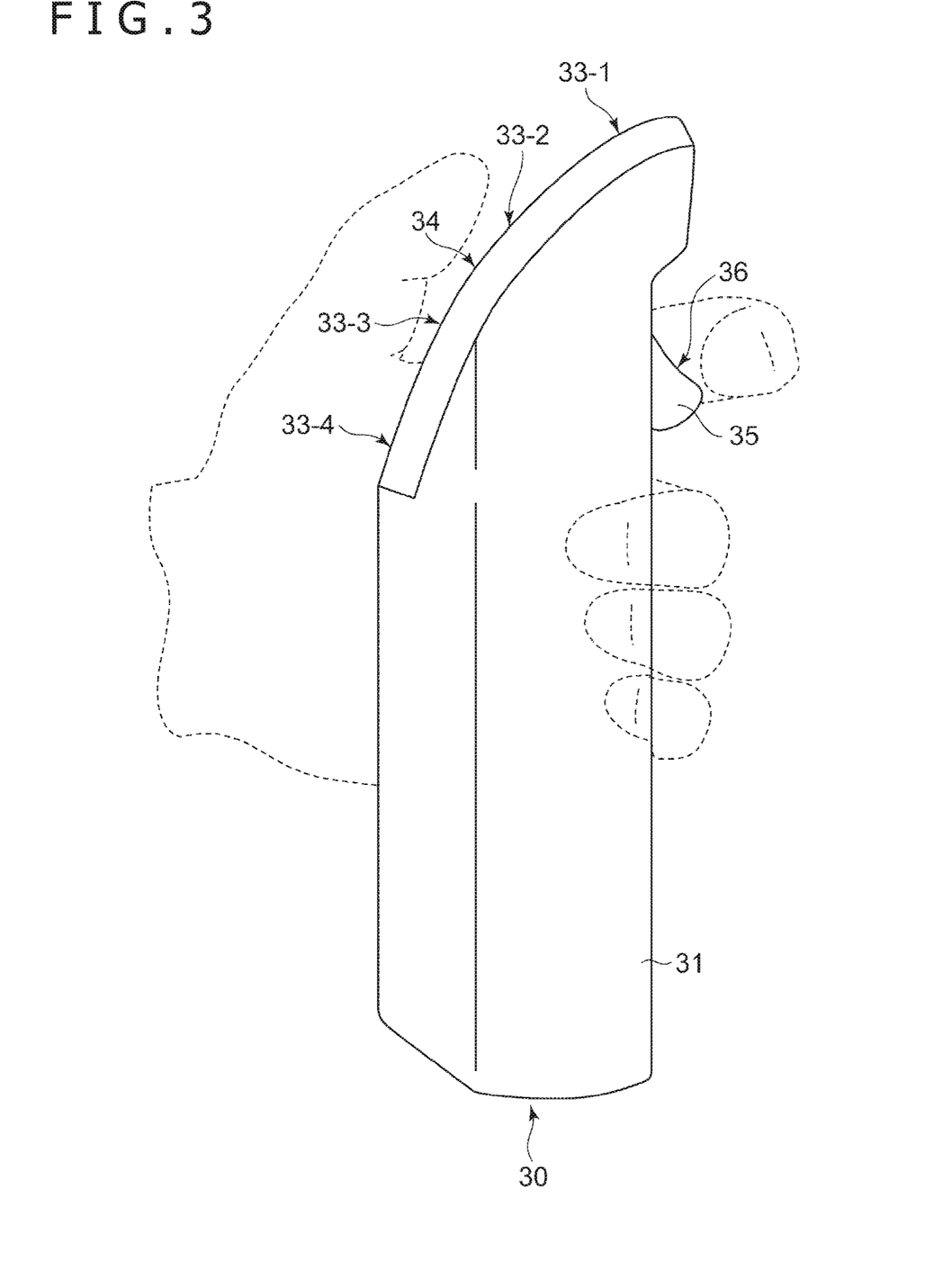
FIG. 3 is a right side view of the controller device illustrating an example of an external appearance thereof.
Figure 4:
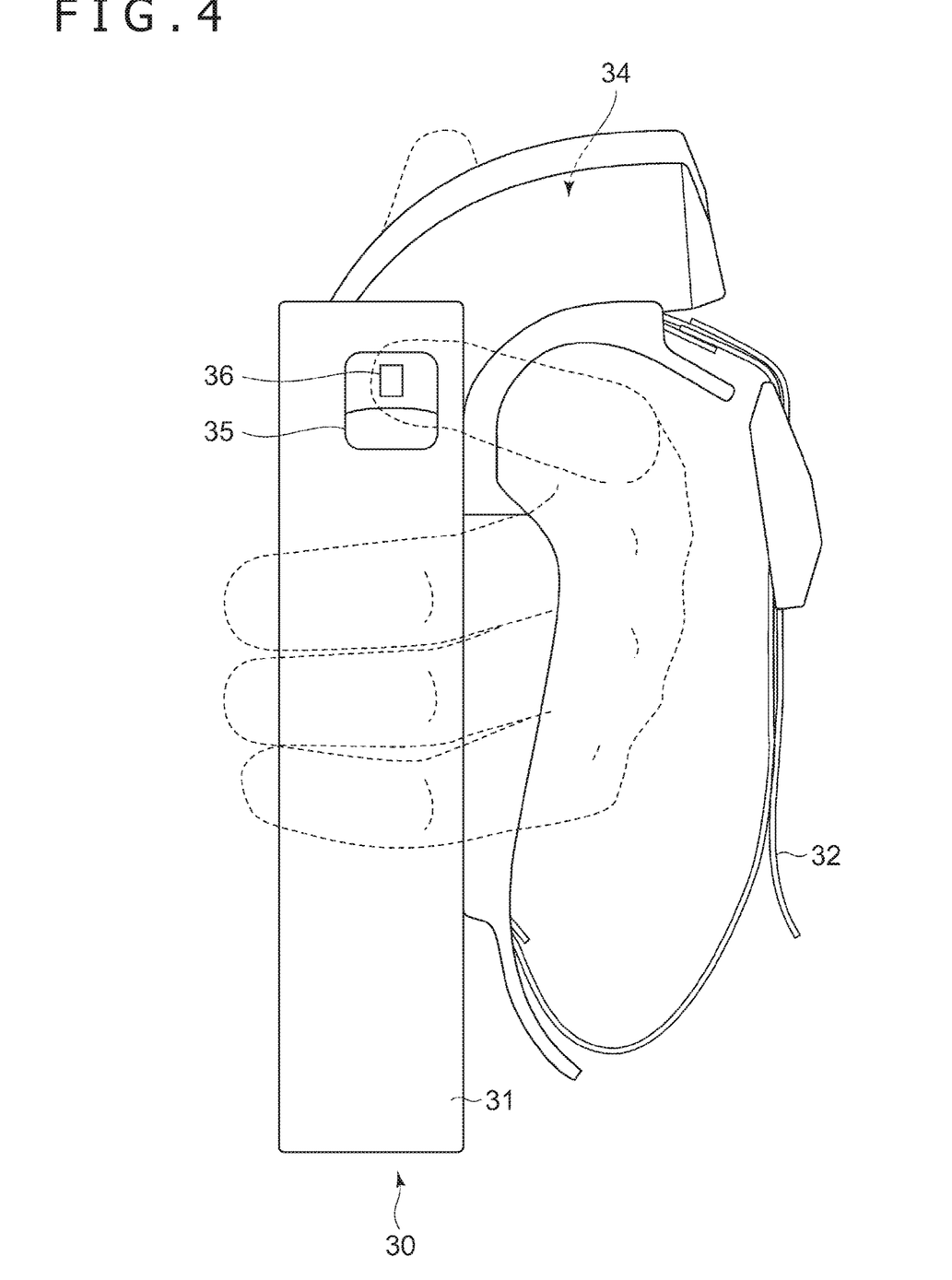
FIG. 4 is a rear side view of the controller device illustrating an example of an external appearance thereof.

The controller device 30 is a device worn on a hand of a user and used for detecting the movement of each of one or more fingers of the hand. FIGS. 2, 3, and 4 each illustrates an example of an external appearance of the controller device 30. FIG. 2 is a perspective view of the controller device 30 as viewed from slightly above illustrating its front side (a thumb side at the time when the user is wearing the controller device 30); FIG. 3 is a right side view; and FIG. 4 is a rear side view. As illustrated in these figures, the controller device 30 includes a main body 31 and a fixture 32, and the user wears the controller device 30 on his or her hand by passing his or her palm through the fixture 32. Here, it is supposed that the user wears the controller device 30 on his or her left hand, and thus, the fixture 32 is attached to the left side of the main body 31 as viewed toward the front. Here, the fixture 32 may be configured by a belt or the like whose length is adjustable according to the size of the hand of the user. Note that although it is supposed here that the user wears the controller device 30 on his or her left hand, the user may wear the controller device 30 on each of his or her both hands.

A plurality of proximity sensors 33 are disposed on a surface of the housing of the main body 31 to detect the movement of the finger of the user. Each of the proximity sensors 33 is a sensor, such as an infrared sensor or an electrostatic sensor, which is capable of measuring a distance to an object existing within a detection range. The information processing device 10 identifies the position of a user's finger targeted for detection, by using detection results of the proximity sensors 33. In the present embodiment, it is assumed that the user's finger targeted for the detections by the proximity sensors 33 is the thumb of a hand on which the user wears the controller device 30.

In the present embodiment, a sensor region 34 having a curved-surface shape and facing the user's thumb is disposed on the surface of the housing of the main body 31. As illustrated in FIGS. 2 and 3, the sensor region 34 is disposed obliquely upward at the front side of the main body 31, and the plurality of proximity sensors 33 are disposed inside the sensor region 34. The sensor region 34 is disposed on a virtual curved surface that is projected toward a user's thumb side. This virtual curved surface has a shape approximate to a spherical surface shape in contact with the base of the user's thumb as viewed from the lateral side in a state in which the user wears the controller device 30.

Further, the sensor region 34 is a region having an elongated curved shape on the virtual curved surface. More specifically, the sensor region 34 is a region having an approximately circular arc-shape along a virtual curved line that is projected toward a side opposite the base side of the user's thumb (that is, an upper right-hand side in FIG. 2) in a state in which the user wears the controller device 30 on the hand. Further, the proximity sensors 33 are disposed so as to be arranged at approximately equal intervals along the virtual curved line. As a result of this configuration, the proximity sensors 33 are disposed along a movement trajectory of the tip of the user's thumb at the time when the user rotates the thumb about a joint of the base of the thumb (that is, a CMC joint described later) in a state in which the user wearing the controller device 30 stretches the thumb. Disposing the proximity sensors 33 along such a curved line enables a relatively small number of the proximity sensors 33 to detect the position of the thumb even when the user moves his or her thumb over a wide range. In the present embodiment, as a specific example, a configuration is employed in which four proximity sensors 33-1 to 33-4 are disposed inside the sensor region 34. In this regard, however, the number of the proximity sensors 33 is not limited to four and may be three or may be five or more.

Further, a trigger button 35 is disposed at a rear side of the controller device 30 (that is, at a side opposite the side at which the proximity sensors 33 are disposed). The trigger button 35 is a button for receiving a push operation by an index finger of the user and is configured to be capable of detecting a push-in amount of the push operation. A proximity sensor 36 is disposed on a surface of the trigger button 35. The proximity sensor 36 may be also, similarly to the proximity sensors 33, an infrared sensor, an electrostatic sensor, or the like and measures a distance to the user's index finger located near the trigger button 35. That is, the controller device 30 detects the movement of the user's thumb, by using the proximity sensors 33 and detects the movement of the user's index finger, by using the proximity sensor 36 and the trigger button 35. Note that one or more sensors for detecting the state of a finger other than the thumb and the index finger may be further disposed on the controller device 30.

Further, the controller device 30 incorporates a control circuit 37. The control circuit 37 transmits a signal indicating the contents of the results of the detections by the proximity sensor 36 and the plurality of individual proximity sensors 33 to the information processing device 10. Further, the control circuit 37 transmits a signal indicating the push-in amount of the trigger button 35 to the information processing device 10.

The display device 40 is a video display device used while being mounted on the head of the user and displays a video corresponding to a video signal transmitted from the information processing device 10 to allow the user to browse the video.

Figure 5:
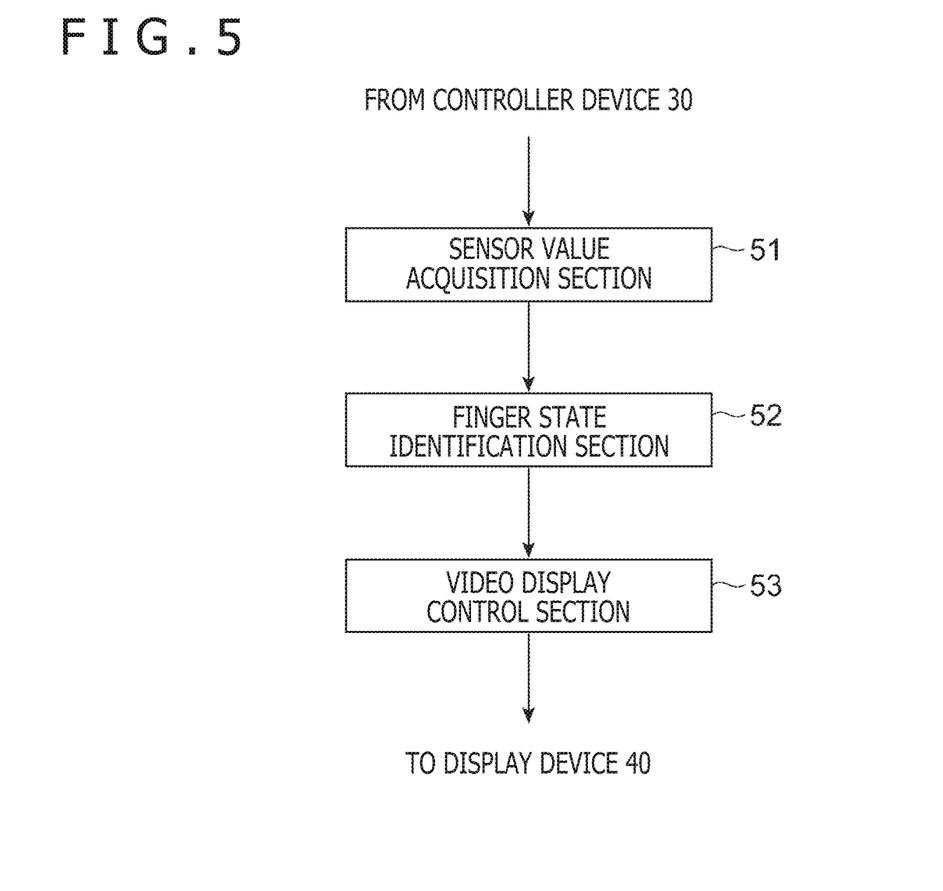
FIG. 5 is a function block diagram of an information processing device.

Next, functions implemented by the information processing device 10 will be described using FIG. 5. As illustrated in FIG. 5, the information processing device 10 functionally includes a sensor value acquisition section 51, a finger state identification section 52, and a video display control section 53. These functions are implemented by allowing the control unit 11 to execute a program stored in the storage unit 12. The program may be provided to the information processing device 10 via a communication network such as the Internet or may be provided in such a way as to be stored in a computer-readable information storage medium such as an optical disk.

The sensor value acquisition section 51 acquires sets of detection values of the individual sensors at the times of periodic transmissions thereof from the controller device 30. Specifically, the sensor value acquisition section 51 acquires sets of a detection value of the proximity sensor 36 and detection values of the proximity sensors 33-1 to 33-4 from the controller device 30 at predetermined time intervals. Additionally, in the case where the user is operating the trigger button 35, the sensor value acquisition section 51 also acquires the numeric value of the push-in amount of the trigger button 35.

Through the use of the detection values of the proximity sensors 33-1 to 33-4 which have been acquired by the sensor value acquisition section 51, the finger state identification section 52 identifies a state of the user's thumb at the times of the detections of the detection values. Specifically, the finger state identification section 52 calculates rotation angles of the individual joints, which define the movement of the user's thumb, on the basis of the detection values of the proximity sensors 33.

Figure 6:
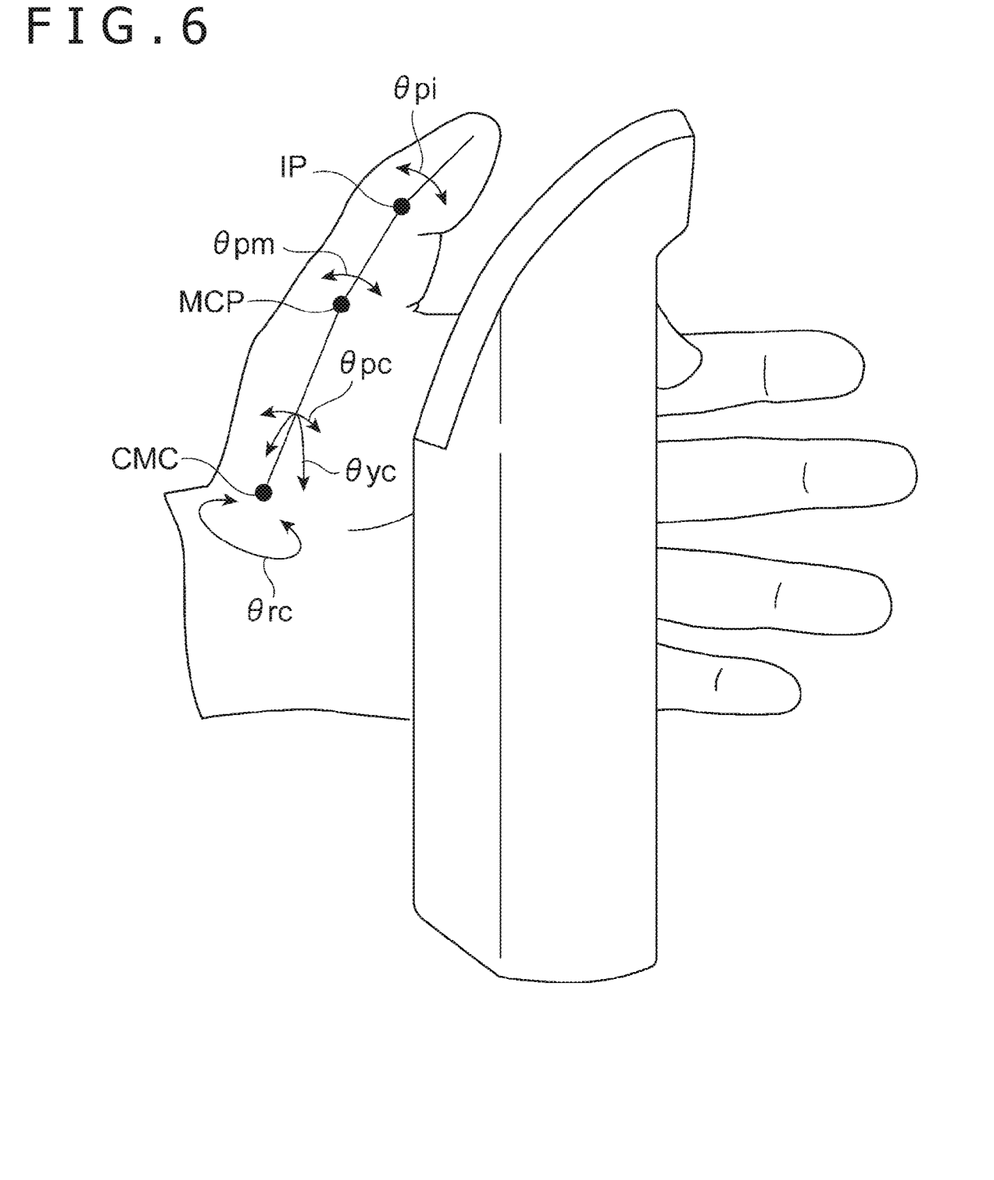
FIG. 6 is a diagram schematically illustrating joints of a finger of a hand.

The thumb changes its posture according to the movements of first, second, and third joints as counted from the tip of the thumb. In the following, these joints will be called an IP joint, an MCP joint, and a CMC joint in the order mentioned above. This calling method is a method conforming to anatomical joint names used in a paper "MRI-based skeletal hand movement model" (Georg Stillfried, Ulrich Hillenbrand, Marcus Settles and Patrick van der Smagt), etc. Among these joints, the IP joint and the MCP joint which are intermediate joins of the finger rotate in one pair of opposite directions in which both the IP joint and the MCP joint are brought close to/away from the palm of the hand in conjunction with bending/stretching of the finger. In the following, the rotation angle of the IP joint will be referred to as a pitch angle $\theta pi$, and the rotation angle of the MCP joint will be referred to as a pitch angle $\theta pm$.

Further, the CMC joint has a structure capable of moving in various directions to allow the direction of the entire thumb to vary. In the following, a rotation angle of the CMC joint in the same pair of opposite directions as the pair of opposite directions of the rotation angle of each of the IP joint and the MCP joint will be referred to as a pitch angle $\theta pc$, and rotation angles of the CMC joint in two pairs of opposite directions which are each orthogonal to the above pair of opposite directions of the rotation angle of each of the IP joint and the MCP joint will be referred to as a yaw angle $\theta yc$ and a roll angle $\theta rc$. The posture of the entire thumb is identified by these five rotation angles of the three joints. For this reason, the finger state identification section 52 calculates the values of the five rotation angles on the basis of the detection values of the four proximity sensors 33. FIG. 6 schematically illustrates pairs of opposite rotation directions of the rotation angles calculated by the finger state identification section 52.

In the following, the detection values of the individual proximity sensors 33-1 to 33-4 will be denoted by S1 to S4. These detection values indicate distances from the individual proximity sensors 33 to the tip of the thumb. Note that it is assumed that the nearer a detected distance is, the larger a detection value is. Further, a total value of the individual detection values, which is calculated using the following formula, will be denoted by Ts.

$$Ts=S1+S2+S3+S4$$

At this time, percentage values indicating the ratios of the individual detection values relative to the total value can be calculated as follows.

$$S1r=S1/Ts$$
$$S2r=S2/Ts$$
$$S3r=S3/Ts$$
$$S4r=S4/Ts$$

The finger state identification section 52 calculates the rotation angles $\theta yc$ and $\theta rc$ of the CMC joint, by using the percentage values S1r to S4r, by means of the following formulas.

$$\theta yc=YC1 \cdot S1r+YC2 \cdot S2r+YC3 \cdot S3r+YC4 \cdot S4r$$

$$\theta rc=RC1 \cdot S1r+RC2 \cdot S2r+RC3 \cdot S3r+RC4 \cdot S4r$$

Here, each of YC1 to YC4 and RC1 to RC4 is a weighting coefficient that is set in advance for a corresponding one of the percentage values in view of a movable range of the thumb. The values of the yaw angle and the roll angle, which are calculated using these formulas, are values each proportional to a weighting average of the four percentage values.

Further, the pitch angles $\theta pi$, $\theta pm$, and $\theta pc$ of the individual joints are values that vary in conjunction with distances from the thumb to the sensor region 34 and can be calculated using the detection values S1 to S4 of the individual sensors by means of the following formulas.

$$\theta pi=PI1 \cdot S1+PI2 \cdot S2+PI3 \cdot S3+PI4 \cdot S4$$

$$\theta pm=PM1 \cdot S1+PM2 \cdot S2+PM3 \cdot S3+PM4 \cdot S4$$

$$\theta pc=PC1 \cdot S1+PC2 \cdot S2+PC3 \cdot S3+PC4 \cdot S4$$

Each of PI1 to PI4, PM1 to PM4, and PC1 to PC4 in the above formulas is a weighting coefficient that is set in advance for a corresponding one of the detection values in view of the movable range of the thumb. The values of the pitch angles, which are calculated using these formulas, are values each proportional to a weighting average of the detection values of the four sensors.

The finger state identification section 52 calculates the values of the five rotation angles by means of the above formulas. These values make it possible to identify in what kind of posture the thumb is in its entirety at the times of the detections by the proximity sensors 33. In this way, the finger state identification section 52 can calculate the rotation angles of the individual joints, by using the detection values of the individual sensors or the percentage values relative to the total value thereof, by means of simple calculations by one-dimensional formulas.

Further, the finger state identification section 52 identifies a state of the user's index finger, by using the detection value of the proximity sensor 36. Specifically, the finger state identification section 52 estimates to what degree the user's index finger is bent toward the palm on the basis of the detection value of the proximity sensor 36 and outputs the result of the estimation. Specifically, it is estimated that the nearer the proximity sensor 36 the user's index finger is located, to the greater degree the user is bending the index finger toward his or her palm. Thus, the finger state identification section 52 calculates a bending amount of the user's index finger from the detection value of the proximity sensor 36 according to a conversion table or a conversion formula that is prepared in advance.

Further, in the present embodiment, in the case where an operation input for the trigger button 35 has been detected, the finger state identification section 52 neglects (rejects) the detection value of the proximity sensor 36 and identifies a state of the user's index finger using the push-in amount of the trigger button 35. The operation input for the trigger button 35 involves a mechanical movement of the button, and thus, it is supposed that information regarding an operation amount for the mechanical movement has higher reliability than information regarding the detection result of the proximity sensor 36. For this reason, in the case where the operation input for the trigger button 35 is available, the finger state identification section 52 uses the operation input therefor in preference to the detection result of the proximity sensor 36, and thereby is capable of accurately identifying the state of the user's index finger. Further, by using the trigger button 35 in the detection of the bending amount of the user's finger makes it possible to present to the user a feeling in a case where the user touches an object existing in a virtual space, or any other similar case.

Note that even in the case where the operation amount (push-in amount) of the trigger button 35 is used, the finger state identification section 52 can calculate the bending amount of the user's index finger, by using a conversion table or a conversion formula, that is given in advance similarly to the case where the detection value of the proximity sensor 36 is used. In this case, the conversion table or the conversion formula is determined in such a way that a bending amount of the finger which is calculated on the basis of the operation amount of the trigger button 35, in the case where an operation amount of the trigger button 35 is equal to zero coincides with a bending amount of the finger which is calculated on the basis of the detection result of the proximity sensor 36, in the case where a distance detected by the proximity sensor 36 is equal to zero. This method makes it possible to seamlessly identify the state of the index finger from a state in which the user is releasing the index finger from the trigger button 35 to a state in which the user is pushing the trigger button 35.

The video display control section 53 draws a video that is to be presented to the user and outputs the video to the display device 40. In the present embodiment, the video display control section 53 is configured to draw a video indicating a condition inside a virtual space in which various objects are disposed. In particular, the video display control section 53 is configured to dispose, inside the virtual space, a hand object that varies in conjunction with the bending/stretching state of the user's finger which is identified by the finger state identification section 52 and draw the state of the hand object. This configuration makes it possible to, when the user performs an operation of bending, stretching, or opening the finger of his or her hand on which the controller device 30 is worn, operate the hand object inside the virtual space in the same way as that for the movement of the finger. Thus, the user can experience a situation as if, in the situation, the user were directly touching or grasping another object inside the virtual space with his or her hand.

As described above, the controller device 30 according to the embodiment of the present invention is configured to dispose the proximity sensors 33 along the curved surface corresponding to the movement trajectory of the user's thumb, and thus is capable of accurately identifying the state of the thumb using a relatively small number of the proximity sensors 33.

Further, the controller device 30 is capable of accurately identifying the state of the user's index finger by combining the proximity sensor 36 and the trigger button 35.

Note that embodiments of the present invention are not limited to the above-described embodiment. Specifically, the shape of the controller device 30 and the arrangement positions of the proximity sensors 33, which are illustrated in the above description, are just examples, and a different shape and a different arrangement that bring about similar effects may be employed.

Further, in the above description, all of the rotation angles of the individual joints constituting the thumb have been calculated on the basis of the detection values of the proximity sensors 33, but a method may employed in which only partial parameters are calculated and the posture of the thumb is determined on the basis the values of the calculated parameters. Further, the calculation formulas for calculating the rotation angles may be different from those described above.

Further, in the above description, the state of the index finger has been identified by combining the button whose push-in amount is detectable and the proximity sensor, but even for a finger other than the index finger, its state may be identified in a similar method.

Further, at least part of the processes having been configured to be performed by the information processing device 10 in the above description may be performed by the control circuit 37 inside the controller device 30. For example, the control circuit 37 may be configured to calculate the values of the rotation angles of the individual joints, on the basis of the detection result of the proximity sensors 33, and transmit the calculated values to the information processing device 10 as numeric values representing the state of the user's thumb.

REFERENCE SIGNS LIST

1 Information processing system, 10 Information processing device, 11 Control unit, 12 Storage unit, 13 Interface unit, 30 Controller device, 31 Main body, 32 Fixture, 33 Proximity sensor, 34 Sensor region, 35 Trigger button, 36 Proximity sensor, 37 Control circuit, 40 Display device, 51 Sensor value acquisition section, 52 Finger state identification section, 53 Video display control section.

The invention claimed is:

1. A system, comprising:
a controller, which includes:
grasping and coupling elements configured such that the controller may be worn on a hand of a user; and
a plurality of sensors that, in a state in which the user wears the controller device on the hand, are disposed so as to be arranged along a movement direction of a tip of a thumb of the user on a virtual curved surface being projected toward a position of the thumb of the user, and
an information processing device, which includes:
an acquisition section that acquires from the controller detection values of the plurality of individual sensors; and
a state identification section that identifies a state of the thumb of the user by calculating a rotation angle of at least one or more joints of the thumb on a basis of the acquired detection values.

2. The system according to claim 1, wherein, in the state in which the user wears the controller device on the hand, the plurality of sensors are disposed so as to be arranged along a virtual curved line being projected toward a side opposite a base side of the thumb of the user and extending along the movement direction of the tip of the thumb of the user.

3. An information processing device comprising:
an acquisition section that acquires, from a controller device that includes grasping and coupling elements configured such that the controller may be worn on a hand of a user, and that includes a plurality of sensors that, in a state in which the user wears the controller device on the hand, are disposed along a virtual curved surface being projected toward a thumb of the user and detect a position of the thumb of the user, detection values of the plurality of individual sensors; and a state identification section that identifies a state of the thumb of the user by calculating a rotation angle of at least one or more joints of the thumb on a basis of the acquired detection values.

4. The information processing device according to claim 3, wherein the controller device includes a detection sensor that detects a position of a target finger of the user within a predetermined detection range, and an operation button operated by the target finger, the acquisition section acquires a detection result of the detection sensor, the state identification section identifies a state of the target finger on a basis of the detection result of the detection sensor, and, when the operation button is pushed, the state identification section rejects the detection result of the detection sensor and identifies the state of the target finger on a basis of an operation amount detected by the operation button.

5. An information processing method comprising:

acquiring, from a controller device that includes grasping and coupling elements configured such that the controller may be worn on a hand of a user, and that includes a plurality of sensors that, in a state in which the user wears the controller device on the hand, are disposed along a virtual curved surface being projected toward a thumb of the user and detect a position of the thumb of the user, detection values of the plurality of individual sensors; and identifying a state of the thumb of the user by calculating a rotation angle of at least one or more joints of the thumb on a basis of the acquired detection values.

6. A non-transitory, computer readable storage medium containing a program, which when executed by a computer, causes the computer to perform an information processing method by carrying out actions, comprising:

acquiring, from a controller device that includes grasping and coupling elements configured such that the controller may be worn on a hand of a user, and that includes a plurality of sensors that, in a state in which the user wears the controller device on the hand, are disposed along a virtual curved surface being projected toward a thumb of the user and detect a position of the thumb of the user, detection values of the plurality of individual sensors; and identifying a state of the thumb of the user by calculating a rotation angle of at least one or more joints of the thumb on a basis of the acquired detection values.

\* \* \* \* \*